United States Patent [19]

Meyer

[11] 4,043,579
[45] Aug. 23, 1977

[54] ELASTOMERIC BUMPER SECURING PRESS FIT CLIP

[75] Inventor: Engelbert A. Meyer, Bloomfield Hills, Mich.

[73] Assignee: USM Corporation, Boston, Mass.

[21] Appl. No.: 674,140

[22] Filed: Apr. 6, 1976

Related U.S. Application Data

[63] Continuation of Ser. No. 572,459, April 28, 1975, abandoned.

[51] Int. Cl.² .............. A44B 17/00; A44B 21/00; B60R 19/08; F16B 13/04
[52] U.S. Cl. .................. 293/71 R; 24/73 B; 24/73 BC; 52/718; 85/5 R; 85/85; 293/65
[58] Field of Search ............ 24/73 B, 73 BC; 52/716, 52/717, 718; 293/1, 62, 64, 65, 66, 67, 71 R; 85/5 R, 85

[56] References Cited

U.S. PATENT DOCUMENTS

| | | | |
|---|---|---|---|
| 2,175,814 | 10/1939 | Pender | 52/718 |
| 2,258,742 | 10/1941 | Cotter | 52/718 X |
| 2,322,656 | 6/1943 | Murphy | 52/717 X |
| 2,329,688 | 9/1943 | Bedford, Jr. | 52/717 |
| 2,655,239 | 10/1953 | Kenlock | 52/716 X |
| 2,748,645 | 6/1956 | Peckham et al. | 85/85 |
| 2,851,757 | 9/1958 | Pender | 52/718 X |
| 3,276,309 | 10/1966 | Engstrom | 85/85 |
| 3,310,929 | 3/1967 | Garvey | 52/717 |
| 3,673,643 | 7/1972 | Kindell | 52/716 X |
| 3,842,565 | 10/1974 | Brown et al. | 293/1 |
| 3,871,430 | 3/1975 | Meyer | 85/5 R |

Primary Examiner—Robert J. Spar
Assistant Examiner—Howard Beltran
Attorney, Agent, or Firm—Aubrey C. Brine; Richard B. Megley; Vincent A. White

[57] ABSTRACT

A generally U or V-shaped resilient clip has legs formed with externally projecting barbs intermediate their bowed length, and internally projecting barbs nearer yieldable ends of the legs. The junction of the leg portions is first freely and partly receivable in an aperture formed in one of two parts to be secured by the clip, the other part having a central rib and oppositely spaced recesses for enclosing the clip ends. The arrangement is such that pressing the two parts together fully seats the clip in the aperture, contact or gripping pressure of the external barbs with the wall of the aperture forcing the internal barbs to "bite" into opposite sides of the rib to hold the parts assembled.

3 Claims, 6 Drawing Figures

1

ELASTOMERIC BUMPER SECURING PRESS FIT CLIP

This is a continuation, of application Ser. No. 572,459, filed Apr. 28, 1975, now abandoned.

BACKGROUND OF THE INVENTION

This invention relates to threadless, push-in type fasteners. More particularly, the invention pertains to one-piece clips formed of sheet metal and provided with prongs or barbs adapted to secure two parts in abutting relation when the parts are pressed together.

In the prior art is has long been known to secure an expandable hollow fastener stem in a receiving hole by slidably driving a wedge-like member thus to force the stem against the wall of the hole. It is also old to provide bendable sheet metal wedging fasteners, for instance such as disclosed in U.S. Pat. No. 2,748,645 or 3,276,309. A "push-on" type of fastener cooperative with a threaded member to hold parts, for instance bumper components, assembled is disclosed in U.S. Pat. No. 3,871,430 issued in my name.

While a great many different types of spring clip fasteners have hitherto been provided, it is well recognized that it is highly important to productivity and subsequent performance to employ particular fasteners selected for their best usage and intended purpose. Accordingly, for example, some situations call for threaded and some for threadless fasteners. The latter category are often advantages when snap-in applications are acceptable and where, for instance because of the unwieldiness or space limitation of the work pieces being assembled, relative rotation of the members is impractical or deemed too slow and costly. An advantageous and illustrative application of push-in fasteners according to this invention is provided by the assembling of elongated members, for example a vehicle bumper and its bumper pad, sometimes termed a "rub-strip."

SUMMARY OF THE INVENTION

In view of the foregoing it is a primary object of this invention to provide an improved prong-carrying clip capable of securing a web or a ribbed-part to an apertured part upon forcing the parts together to urge the nose of the clip into the aperture.

A further object of the invention is to provide economical fastener means for aligning an elongated opening or series of openings in one member with a strip which is to be secured thereto to cover both the opening and the fastener means therein.

To these ends, one or more resilient one-piece sheet metal clips of generally U or V-shaped configuration are respectively provided along edges of their legs portions with oppositely disposed pairs of prongs or barbs, the prongs being directed inwardly if arranged nearer the free ends of the portions and projecting outwardly when nearer the junction of the leg portions. As herein shown by way of illustration, the U or V-shaped junction is shaped to be partly received initially in one or more openings in a bumper to which a strip such as a pad provided with an integral web or rib portion is to be attached. Having placed the "nose" of the clip in the opening and caused the web or rib of the strip to be straddled by the clip legs, the parts are secured in interlocking relation by pressing the bumper and strip together, resultant squeezing together of the leg portions of the clip causing their pairs of prongs to grippingly engage the walls of the bumper opening and simultaneously causing other of the clip prongs to bite into the strip web or rib thereby retaining the parts assembled. Better to insure that increased holding power is achieved, especially when either or both of the parts being assembled is of elastomeric material, the clip legs preferably are initially bowed outwardly in portions intermediate their junction and the web engaging prongs and to an extent greater than the spacing of the unstressed walls of the opening which are to be gripped.

BRIEF DESCRIPTION OF THE DRAWINGS

The foregoing and other features of the invention will now be more particularly described in connection with an illustrative embodiment, and with reference to the accompanying drawings thereof, in which.

DESCRIPTION OF THE PREFERRED EMBODIMENT

Figure 1:
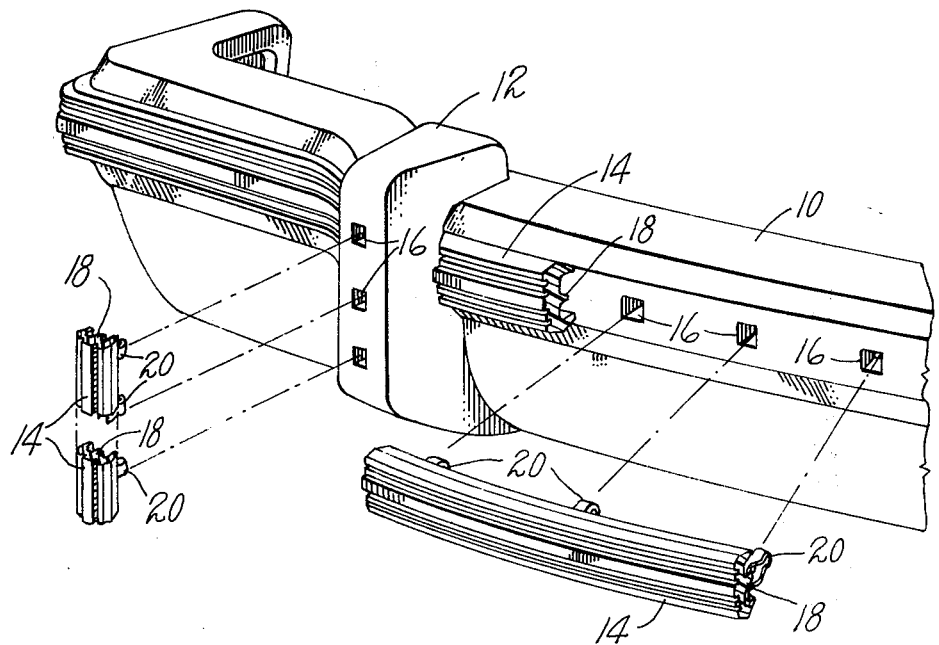
FIG. 1 is a perspective view of an automobile bumper and bumperette to which an elastomeric bumper pad or rub strip is to be secured by clip fastener means of this invention.
Figure 2:
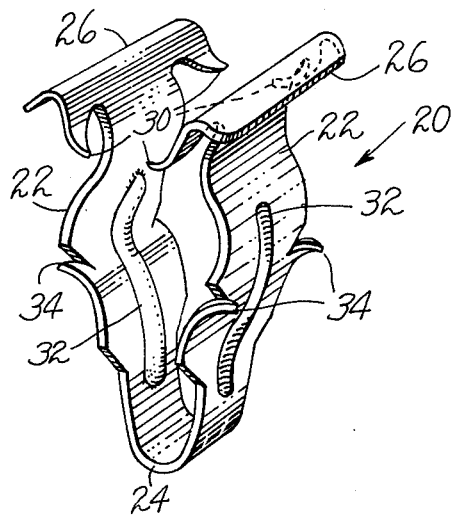
FIG. 2 is a perspective on a larger scale of one unstressed clip.

A workpiece, for instance a bumper 10 (FIG. 1) which may also include a bumperette 12, is to have a member, such as an elastomeric ornamental and protective rub strip 14 secured thereto, the bumper (and bumperette, if any) having apertures 16 (FIGS. 2, 3-6), and the strip being formed (as by molding) with an elongated web or rib 18. A plurality of generally U or V-shaped, one-piece resilient clip generally designated 20 (FIGS. 2-6) is provided for conveniently securing the bumper and its strip in properly aligned and abutting relation as will hereinafter be described.

Each clip 20 is formed of sheet metal which may initially have been substantially rectangular. It is formed with symmetrical leg portions 22,22 joined at a rounded nose portion 24. Free ends 26,26 of the legs are rounded and extend outwardly to bear on the bottoms of longitudinal recesses 28,28 respectively formed along opposite sides of the rib 18 of the strip 14. Each end 26 has its opposite side edges formed with inwardly projecting prongs 30,30 for a purpose to be later explained.

The divergent leg portions 22 intermediate the nose 24 and the ends 26 are bowed outwardly so as to be spaced apart, when unstressed, a distance somewhat wider than opposite walls of the apertures 16 to be engaged thereby. Desirably these convex leg portions are also formed with impressed stiffening ribs 32, respectively. As herein shown the nose portion 24 is narrowest to facilitate insertion, the ends 26 are widest to afford stable bearing surfaces, and the bowed leg portions are of mediate width. Each of the legs in its convex portion is provided at its opposite edges with outwardly projecting prongs 34,34 tips of the latter when unstressed being spaced a greater distance apart than the opposite walls of the apertures 16 to be engaged thereby and being biased toward the free ends 26 to permit slidable entry into the apertures but afford resistance to withdrawal.

Figure 3:
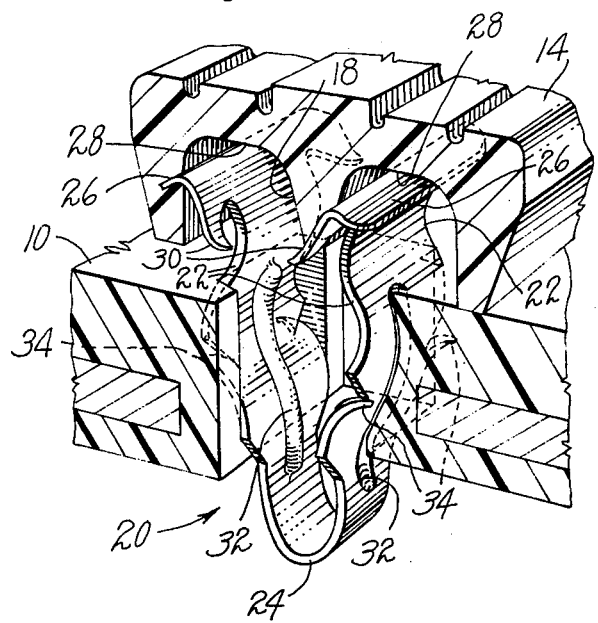
FIG. 3 is a perspective view of the fully installed clip securing the bumper and rub strip in assembled relation.
Figure 4:
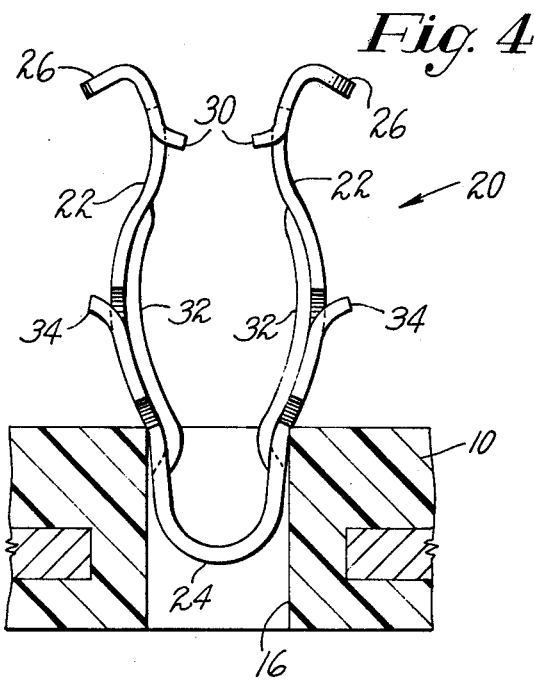
FIG. 4 is a front view of the clip shown in FIGS. 2 and 3 when initially presented to a bumper opening in preparation for assembly.
Figure 6:
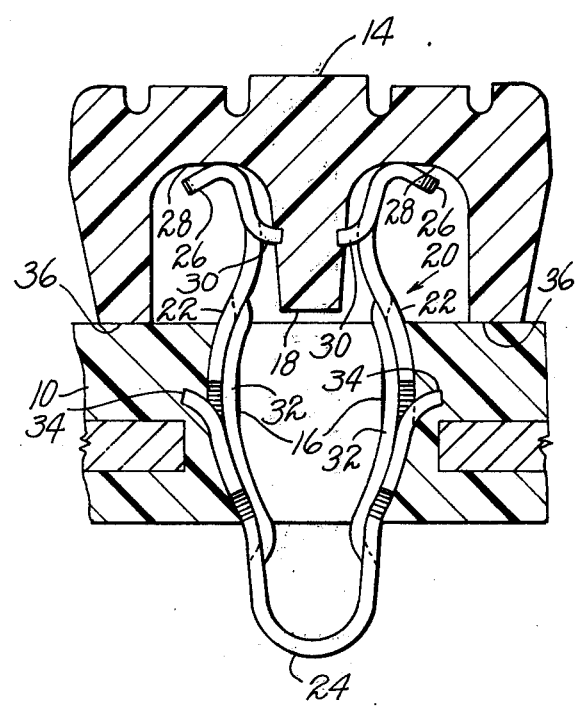
FIG. 6 is a view similar to FIG. 5 but showing the parts when urged together and anchored by the clip in final assembly.
Figure 5:
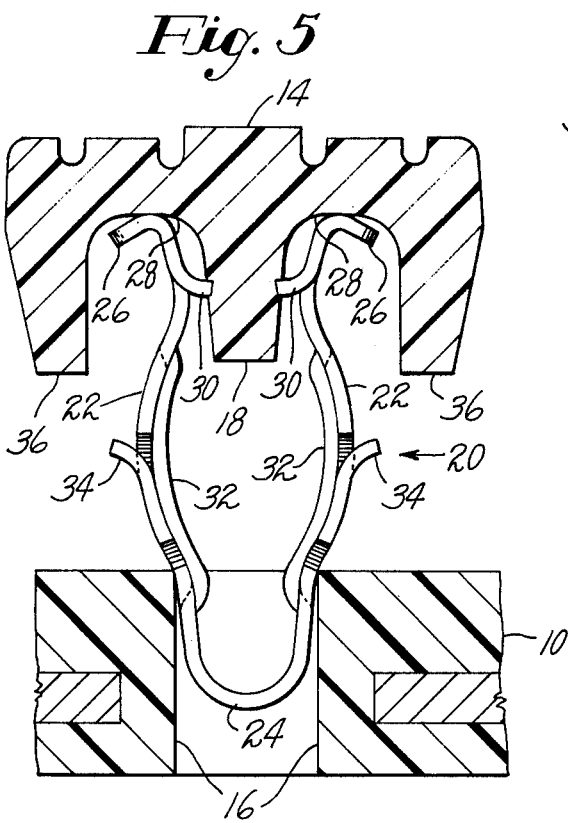
FIG. 5 is a view similar to FIG. 4 and showing the next stage in assembly.

FIGS. 4-6 sequentially show the steps of securing the bumper 10 and the strip 14 by means of the clip 20. As indicated in FIG. 4 each clip is initially placed with its nose portion 24 partly in a bumper hole 16. Then the strip is disposed with its rib 18 extending between the leg portions 26,26 of the respective clips as shown in FIG. 5. Lastly the strip and bumper are forced together as shown in FIGS. 3,6. During the last step of assembly, the bumper being generally of harder material such as urethane than the rub strip, walls of the aperture 16 cam the free leg ends 26 together as the prongs 34 become embedded in the bumper. Accordingly, the inwardly projecting prongs 30 are urged to bite into opposite sides of the rib 18 as outer faces 36,36 of the strip abut the bumper and enclose the fully seated fastener 30.

From the foregoing it will be appreciated that the rub strip 14 will be properly secured in alignment with the bumper as determined by the holes 16, and that the clips 20 insure fast, economical and convenient anchoring means.

Having thus described my invention what I claim as new and desire to secure as Letters Patent of the United States is:

1. For securing a rib-carrying strip to an apertured member, the member being of material at least as hard as the material of the strip, a one-piece resilient sheet metal clip having opposed legs joined in a rounded nose portion receivable in the aperture of said member, the legs in localities nearer their free ends having inwardly projecting spaced prongs substantially directed toward said nose portion and engageable with opposite sides of the rib, the large intermediate said ends and the nose portion being bowed outwardly, and at least one pair of outwardly projecting prongs formed on the outwardmost intermediate bowed portions and substantially directed away from said nose portion whereby, upon engagement of the bowed portions with opposite walls of said aperture, the inwardly projecting prongs are yieldably urged together to bite into and grippingly engage said rib and the outwardly projecting prongs become embedded for securement in said walls to resist separation of the strip and the member.

2. A clip for securing a strip formed with a longitudinally recessed rib to an apertured mounting member by press fit, the material of the member being at least as hard as that of the rib, the clip comprising a generally V-shaped blind fastener having divergent resilient legs, mid portions of the legs being bowed outwardly and being formed at opposite side edges, respectively, with outwardly projecting prongs disposed on the outwardmost portion of said bowed legs and substantially directed toward the free ends of said legs which, when unstressed, are spaced apart greater than opposed walls of the aperture to be engaged thereby, the free ends of the legs being receivable along opposite sides of the strip rib, respectively, and the legs each bearing at least one inwardly projecting prong substantially directed opposite to said outwardly projecting prongs for biting into the rib when forced to do so by cam action of the aperture walls on receiving said bowed mid portions and on penetrably receiving said outwardly projecting prongs.

3. A clip as in claim 2 wherein the inwardly projecting prongs are respectively formed in opposed side edges and any separation of the strip from the member tends to effect further embedment of the prongs.

* * * * *